United States Patent [19]
Aarts et al.

[11] Patent Number: 6,130,789
[45] Date of Patent: Oct. 10, 2000

[54] OPTICAL SCANNING DEVICE COMPRISING A LENS SYSTEM WITH A COMPACT ACTUATOR

[75] Inventors: Jan W. Aarts; Jan P. Baartman, both of Eindhoven, Netherlands

[73] Assignee: U.S. Philips Corporation, New York, N.Y.

[21] Appl. No.: 09/291,430

[22] Filed: Apr. 13, 1999

[30] Foreign Application Priority Data

Apr. 17, 1998 [EP] European Pat. Off. .............. 98201240

[51] Int. Cl.[7] ...................................................... G02B 7/02
[52] U.S. Cl. ............................................ 359/819; 359/823
[58] Field of Search .................................. 359/819, 823, 359/824, 822

[56] References Cited

U.S. PATENT DOCUMENTS 4,306,206  12/1981  Myers ...................................... 335/230
5,712,842   1/1998  Yamamoto et al. ...................... 369/112

FOREIGN PATENT DOCUMENTS

157429A  3/1989  Japan .

*Primary Examiner*—Ricky Mack
*Attorney, Agent, or Firm*—Michael E. Belk

[57] ABSTRACT

An optical scanning device includes an optical lens system for focusing a light beam into a scanning spot on an information carrier. The lens system includes a housing containing a main or objective lens and an auxiliary or solid immersion lens with a ring-shaped holder. The lens combination provides a large numerical aperture, so that the scanning device is suitable for scanning information carriers with a high information density, such as high-density compact discs. The lens system also includes an actuator for displacing the lens system and for displacing the auxiliary lens with respect to the main lens in a direction parallel to an optical axis of the lens system for compensating for spherical aberration in a transparent protection layer of the information carrier. The actuator includes a ring-shaped magnetic closing yoke which is secured to a housing and includes two ring-shaped permanent magnets which, viewed parallel to the optical axis, are secured next to one another to the closing yolk. The magnets are magnetised in mutually opposite radial directions relative to the optical axis. The actuator also includes two ring-shaped electric coils, which are secured to a ring-shaped holder of the auxiliary lens. The coils are arranged, viewed parallel to the optical axis, next to one another and opposite the two magnets, and the coils are wound in mutually opposite directions. In this manner, the actuator of the lens system has a favorable ratio between its dimensions and its electromagnetic force, so that the dimensions and weight of the actuator necessary for obtaining a predetermined electromagnetic force can be limited.

12 Claims, 4 Drawing Sheets

OPTICAL SCANNING DEVICE COMPRISING A LENS SYSTEM WITH A COMPACT ACTUATOR

FIELD OF THE INVENTION

The invention relates to the field of actuators for adjusting the axial position of lenses in an optical system of a scanner of an information carrier.

BACKGROUND OF THE INVENTION

The invention relates to an optical scanning device for scanning an information track of an optically scannable information carrier, which scanning device includes a radiation source, an optical lens system with an optical axis for focusing a radiation beam supplied, in operation, by the radiation source into a scanning spot on the information carrier, and a first actuator for moving the lens system parallel to the optical axis, the lens system including two lens elements and a second actuator for displacing a first one of the lens elements relative to a second one of the lens elements.

The invention further relates to an optical lens system which can suitably be used in an optical scanning device in accordance with the invention.

The invention also relates to an optical player including a table which can be rotated about an axis of rotation, an optical scanning device for scanning an information track of an optically scannable information carrier which can be arranged on the table, and a displacement device for moving the scanning device during operation, mainly in a radial direction relative to the axis of rotation.

An optical scanning device and an optical player of the types mentioned in the opening paragraphs are known from U.S. Pat. No. 5,712,842. The optical lens system of the known optical scanning device includes an objective lens and a relatively small, so-called solid immersion lens, which is arranged between the objective lens and the information carrier to be scanned. By using the solid immersion lens, the lens system of the known optical scanning device has a relatively large numerical aperture, so that a relatively small scanning spot on the information carrier to be scanned is achieved. As a result, the known scanning device can suitably be used to scan information carriers having relatively small elementary information characteristics, that is, information carriers with a relatively high information density, such as a high-density CD. Using the first actuator of the known scanning device, the lens system is displaced parallel to the optical axis, thus enabling the scanning spot to be focused on the information layer of the information carrier. Using the second actuator of the known scanning device, the solid immersion lens is displaced relative to the objective lens, parallel to the optical axis, so that a spherical aberration of the radiation beam in a transparent protective layer of the information carrier present between the information layer and the scanning device can be corrected.

The second actuator of the known scanning device includes a ring-shaped electric coil, which is secured to a first holder to which the solid immersion lens is secured, and a ring-shaped permanent magnet which is secured to a second holder to which the objective lens is secured. The first holder is secured to the second holder using a leaf spring. By interaction between a magnetic field of the magnet and an electric current in the coil, the solid immersion lens can be displaced relative to the objective lens, in a direction parallel to the optical axis of the lens system, thereby deforming the leaf spring.

SUMMARY OF THE INVENTION

A drawback of the known optical player and the known optical scanning device used therein, is that the magnetic field of the magnet of the second actuator is scattered substantially, so that at the location of the coil of the second actuator, there is only a limited magnetic field strength and the second actuator supplies only a limited electromagnetic force. Consequently, to obtain a sufficiently large electromagnetic force, the magnet and the coil of the second actuator must have relatively large dimensions.

It is an object of the invention to provide an optical scanning device and an optical player of the types mentioned in the opening paragraphs, in which the second actuator has a favorable ratio between the electromagnetic force which can be supplied and the dimensions of the second actuator, so that the dimensions and weight of the second actuator, which are necessary to obtain a sufficiently large electromagnetic force, can be limited.

To achieve this, the optical scanning device in accordance with the invention is characterized in that the second actuator is provided with two ring-shaped permanent magnets which, viewed parallel to the optical axis, are secured, next to each other, to a substantially ring-shaped magnetic closing yoke, which is secured to a housing of the lens system, and two ring-shaped electric coils which are secured to a substantially ring-shaped holder of the first lens element, the magnets being magnetized in mutually opposite radial directions relative to the optical axis, while the coils, viewed parallel to the optical axis, are arranged next to each other, opposite the two magnets, and are wound in mutually opposite directions.

To achieve this, the optical player in accordance with the invention is characterized in that the optical scanning device employed therein is an optical scanning device in accordance with the invention.

By using the two magnets which are magnetized in opposite directions and the closing yoke, a concentrated magnetic field is obtained which passes substantially entirely through the closing yoke and is transferred substantially entirely from one of the two magnets to the other magnet, so that scattering of the magnetic field of the magnets is precluded as much as possible. The coils are arranged opposite the magnets in the part of the magnetic field which is transferred from one of the two magnets to the other magnet. The part of the magnetic field has a relatively large magnetic field strength, so that by interaction between the magnetic field of the magnets and an electric current in the coils a relatively large electromagnetic force is obtained. Since the coils are wound in mutually opposite directions, the components of the electromagnetic force exerted on the individual coils extend substantially in equal directions. As a result, the second actuator has a favorable ratio between the electromagnetic force that can be supplied and the dimensions of the magnets and the coils, so that the dimensions and the weight of the second actuator, which are necessary to obtain a sufficiently large electromagnetic force, can be limited.

A particular embodiment of an optical scanning device in accordance with the invention is characterized in that the holder of the first lens element is made from a non-magnetizable material. By virtue thereof, it is achieved that the magnets do not exert forces on the holder of the first lens element in directions perpendicular to the optical axis, so that mechanical loads on a necessary bearing of the holder, which are directed perpendicularly to the optical axis, are limited.

A further embodiment of an optical scanning device in accordance with the invention is characterized in that the two coils of the second actuator are wound from a single wire and each include an even number of winding layers. Since the coils each include an even number of winding layers, the two electrical connection points of the wire can be provided on a single side of one of the two coils, so that a simple electrical connection of the coils is obtained.

Yet another embodiment of an optical scanning device in accordance with the invention is characterized in that the wire is successively wound so as to form an odd number of winding layers of a first one of the coils, all winding layers of a second one of the coils, and the remaining winding layers of the first coil. By virtue thereof, it is achieved that during winding the coils, a winding direction of a winding machine to be used only has to be reversed twice. In addition, it is achieved that there are only two electrical connections between the two coils.

A particular embodiment of an optical scanning device in accordance with the invention is characterized in that the first lens element, viewed parallel to the optical axis, is elastically suspended in the housing using two mounting elements which, viewed parallel to the optical axis, are arranged at some distance from each other and extend transversely to the optical axis, each mounting element, viewed parallel to the optical axis, being elastically deformable and, viewed at right angles to the optical axis, being substantially undeformable. By using the two mounting elements, displacements of the first lens element parallel to the optical axis are possible, thereby elastically deforming the two mounting elements. Viewed perpendicularly to the optical axis, the first lens element is substantially undisplaceable relative to the housing, while tilting of the first lens element about tilt axes directed perpendicularly to the optical axis are precluded by co-operation of the two mounting elements. In this manner, it is achieved that the two mounting elements hold the first lens element in an accurate position relative to the housing and the second lens element, in which position the optical axes of the two lens elements substantially coincide.

A further embodiment of an optical scanning device in accordance with the invention is characterized in that the second actuator, viewed parallel to the optical axis, is arranged between the two mounting elements. In this manner, the available space between the two mounting elements is efficiently used, so that a compact construction of the lens system of the scanning device is obtained.

Yet another embodiment of an optical scanning device in accordance with the invention is characterized in that the closing yoke of the second actuator forms a part of the housing. By virtue thereof, a compact and light construction of the housing is obtained.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENTS

Figure 1:
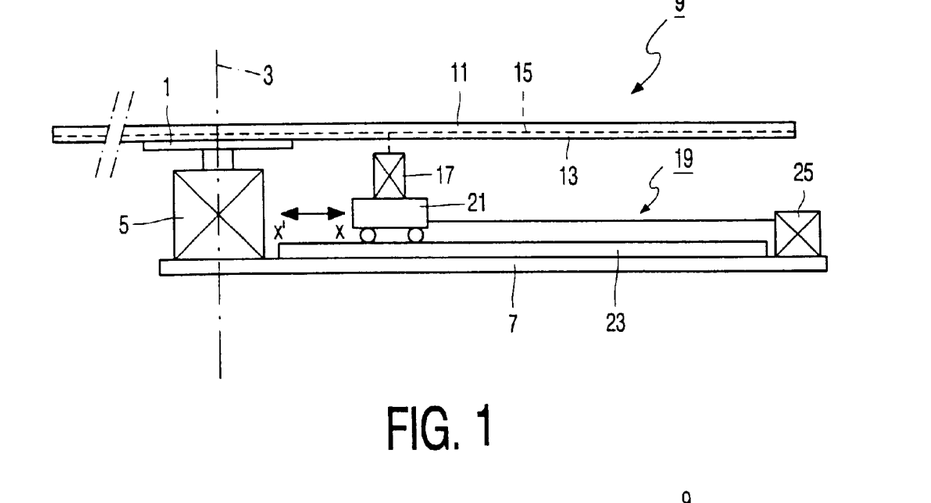
FIG. 1 schematically shows an optical player in accordance with the invention.

FIG. 1 schematically shows an optical player in accordance with the invention, which includes a table 1 which can be rotated about an axis of rotation 3 and can be driven by an electric motor 5 which is secured onto a frame 7. On table 1, an optically scannable information carrier 9, such as a CD, can be arranged which is provided with a disc-shaped support 11 and a transparent protective layer 13. A side of the support 11 bordering on the protective layer 13 forms an information layer 15 of the information carrier 9 on which a spiral-shaped information track is present. The optical player further includes an optical scanning device 17 in accordance with the invention for optically scanning the information track of the information carrier 9. Scanning device 17 can be displaced using displacement device 19 of the optical player relative to the axis of rotation 3 predominantly in two opposite radial directions X and X'. To this end, the scanning device 17 is secured to a slide 21 of the displacement device 19 which is further provided with a straight guide 23 provided on the frame 7 and extending parallel to the X direction, over which guide the slide 21 is guided in a displaceable manner, and an electric motor 25 for displacing slide 21 along guide 23. In operation, an electrical control unit of the optical player, not shown in the Figures, controls the motors 5 and 25, causing the information carrier 9 to rotate about the axis of rotation 3, and simultaneously, the scanning device 17 to be displaced parallel to the X-direction, in such a manner that the spiral-shaped information track present on the information carrier 9 is scanned by the scanning device 17. During scanning, information present on the information track can be read by the scanning device 17 or information can be written on the information track by the scanning device 17.

Figure 2:
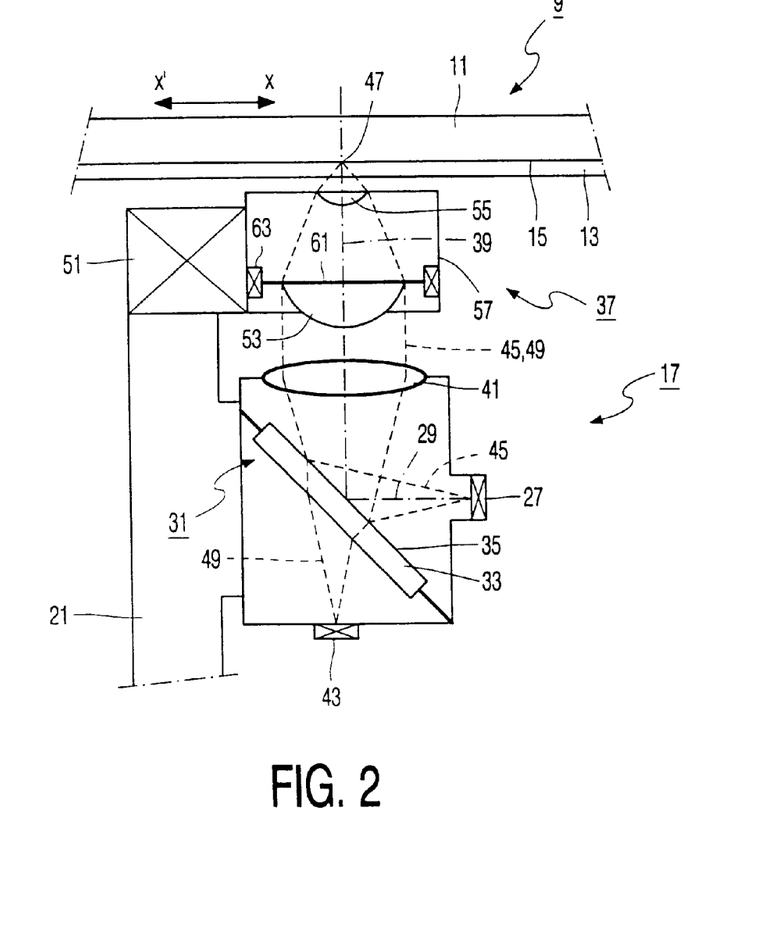
FIG. 2 schematically shows an optical scanning device in accordance with the invention, which is used in the optical player in accordance with FIG. 1.

The optical scanning device 17 in accordance with the invention, used in the optical player in accordance with the invention is schematically shown in FIG. 2. Scanning device 17 is provided with a radiation source 27, for example a semiconductor laser, with an optical axis 29. The scanning device 17 further includes a radiation beam splitter 31 which includes a transparent plate 33 which is arranged at an angle of 45° relative to the optical axis 29 of the radiation source 27 and includes a reflective surface 35 facing the radiation source 27. The scanning device 17 further includes an optical lens system 37 with an optical axis 39 and a collimator lens 41 arranged between the radiation beam splitter 31 and the lens system 37. The optical axis 39 of the lens system 37 and the optical axis 29 of the radiation source 27 include an angle of 90°. The scanning device 17 further includes an optical detector 43 which, relative to the lens system 37, is arranged behind the radiation beam splitter 31, the optical detector being of a type which is known per se and customarily used. In operation, the radiation source 27 generates a radiation beam 45 which is reflected by the reflective surface 35 of the radiation beam splitter 31 and focused by the lens system 37 into a scanning spot 47 on the information layer 15 of the information carrier 9. The radiation beam 45 is reflected by the information layer 15 into a reflected radiation beam 49 which is focused on the optical detector 43 via the lens system 37, the collimator lens 41 and the radiation beam splitter 31. For reading information present on the information carrier 9, the radiation source 27 generates a continuous radiation beam 45, and the optical detector 43 supplies a detection signal which corresponds to a series of elementary information characteristics on the information track of the information carrier 9, which elementary information characteristics are successively present in the scanning spot 47. For writing information on the information carrier 9, the radiation source 27 generates a radiation beam 45 which corresponds to the information to be written, in the scanning spot 47 a series of successive elementary information characteristics being generated on the information track of the information carrier 9.

As is also shown in FIG. 2, the scanning device 17 includes a first actuator 51 for displacing the lens system 37 can be displaced over relatively small distances parallel to the optical axis 39 of the lens system 37, and over relatively small distances parallel to the X-direction. By displacing the lens system 37 using first actuator 51 in a direction parallel to the optical axis 39, the scanning spot 47 is focused with a desired degree of accuracy on the information layer 15 of the information carrier 9. By displacing the lens system 37 using the first actuator 51 in a direction parallel to the X-direction, the scanning spot 47 is maintained with a desired accuracy on the information track to be followed. To this end, the first actuator 51 is driven by the above-mentioned control unit of the optical player, which receives both a focus-error signal and a track-error signal from the optical detector 43.

Figure 3:
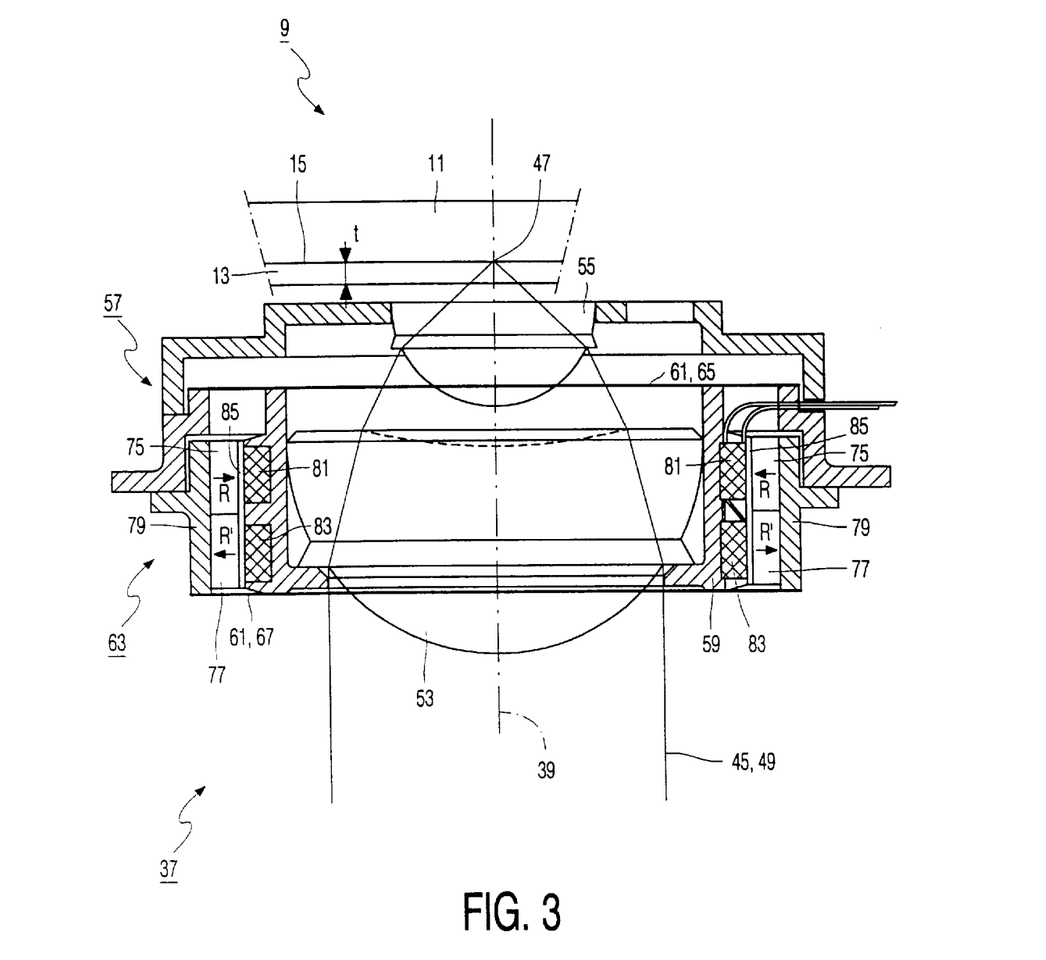
FIG. 3 shows an optical lens system in accordance with the invention, which is used in the optical scanning device in accordance with FIG. 2.

The optical lens system 37 used in the optical scanning device 17 is shown in detail in FIG. 3 and includes a first lens element 53 and a second lens element 55. The first lens element 53 is an objective lens and constitutes a main lens of the lens system 37. The second lens element 55 is a so-called solid immersion lens, which is arranged between the objective lens and the information carrier 9 to be scanned, and which constitutes a relatively small auxiliary lens of the lens system 37. By employing, apart from the main lens 53, auxiliary lens 55, the lens system 37 has a relatively large numerical aperture, so that the scanning spot 47 on the information layer 15 of the information carrier 9 is relatively small. As a result, the scanning device 17 is suitable for scanning optical information carriers having relatively small elementary information characteristics, i.e. optical information carriers having a relatively high information density, such as a high-density CD. As shown in FIG. 3, the auxiliary lens 55 is secured in a fixed position to a housing 57 of the lens system 37, which housing 57 is secured to the first actuator 51 and hence can be displaced parallel to the optical axis 39 of the lens system 37 using first actuator 51. The main lens 53 is secured to a substantially ring-shaped holder 59 which, viewed parallel to the optical axis 39, is elastically suspended in the housing 57 using an elastically deformable mounting unit 61, which will be described in greater detail hereinbelow, main lens 53 being displaceable, parallel to the optical axis 39, relative to the housing 57, thereby elastically deforming mounting unit 61. As shown in FIG. 3, the lens system 37 further includes a second actuator 63, which will be described in greater detail hereinbelow, for displacing main lens 53, parallel to the optical axis 39 of the lens system 37, relative to the housing 57 and the auxiliary lens 55. By displacing the main lens 53 relative to the auxiliary lens 55, in a direction parallel to the optical axis 39, using second actuator 63, a spherical aberration of the radiation beam 45 in the transparent protective layer 13 of the information carrier 9 is corrected. Such a spherical aberration is predominantly caused by fluctuations in the thickness t of the protective layer 13. The second actuator 63 is also driven by control unit of the optical player, which receives an error signal from a sensor of the scanning device 17, not shown in the Figures for the sake of simplicity, by using the sensor, for example, to measure the thickness t of the protective layer 13 near the scanning spot 47.

Figure 4:
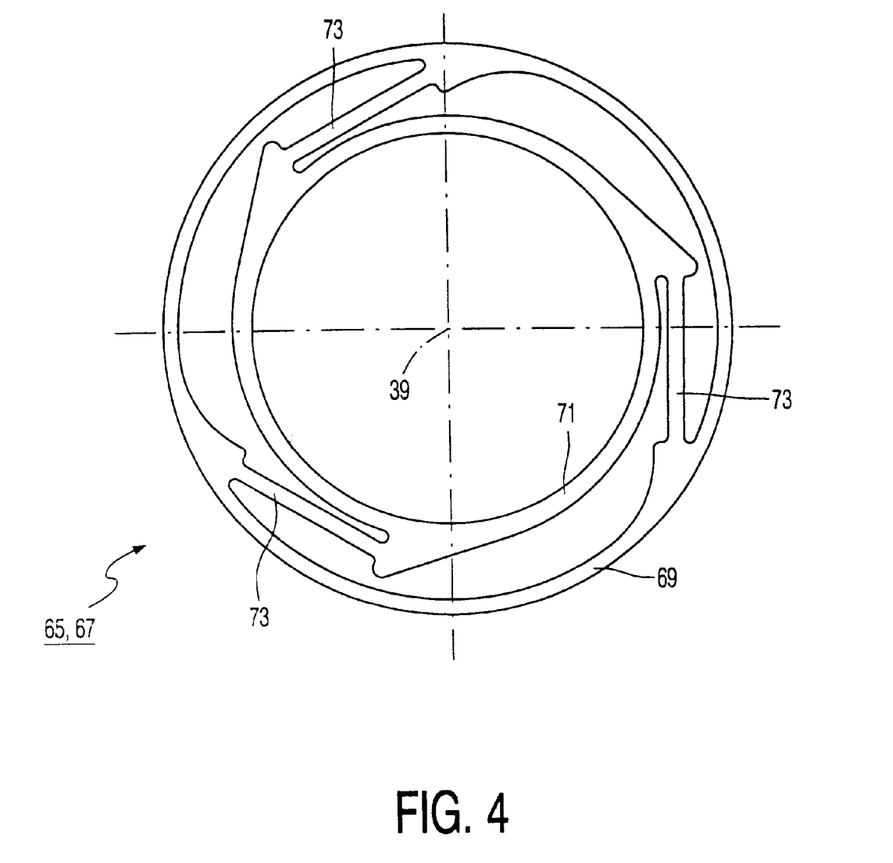
FIG. 4 shows an elastically deformable mounting element of the optical lens system in accordance with FIG. 3, FIG. 5 schematically shows a magnetic field of an actuator used in the optical lens system in accordance with FIG. 4.

As shown in FIG. 3, the mounting unit 61 includes two mounting elements 65, 67 which, viewed parallel to the optical axis 39, are arranged at a distance from each other and extend transversely to the optical axis 39. The mounting elements 65, 67, which are identical and shown in detail in FIG. 4, are, viewed at right angles to the optical axis 39, substancially undeformable and, viewed parallel to the optical axis 39, elastically deformable. For this purpose, as shown in FIG. 4, the mounting elements 65, 67 are each provided with a first, predominantly ring-shaped portion 69 which is secured to the housing 57 of the lens system 37, and a second, predominantly ring-shaped portion 71 which is secured to the holder 59 of the main lens 53, ring-shaped portions 69 and 71 being interconnected by three bendable bridges 73 which extend in a plane transverse to the optical axis 39 and are mutually placed at regular intervals, and each bendable bridge 73 of the mounting element 65 being directed so as to extend substantially parallel to, respectively, one of the bendable bridges 73 of the mounting element 67. By using the two mounting elements 65, 67, the main lens 53 is given, viewed parallel to the optical axis 39, a freedom of displacement, while, viewed at right angles to the optical axis 39, a relatively rigid bearing of the main lens 53 relative to the housing 57 is obtained. The co-operation between the two mounting elements 65, 67 additionally provides the mounting unit 61 with a relatively high tilt resistance about every tilt axis directed perpendicularly to the optical axis 39, so that tilting of the main lens 53 relative to the housing 57 about tilt axes directed at right angles to the optical axis 39 is precluded as much as possible. By virtue thereof, it is achieved that an aligmnent of the main lens 53 and the auxiliary lens 55 relative to each other, which is obtained during the manufacture of the lens system 37, and as a result of which the optical axes of the main lens 53 and the auxiliary lens 55 coincide as much as possible, is maintained in operation to the extent possible.

As shown in FIG. 3, the second actuator 63, viewed parallel to the optical axis 39, is arranged between the two mounting elements 65, 67 of the mounting unit 61, so that the space available between the two mounting elements 65, 67 is efficiently used and a compact construction of the lens system 37 is obtained. The actuator 63 has two ring-shaped permanent magnets 75, 77 which, viewed parallel to the optical axis 39, are arranged one beside the other and secured to a substantially ring-shaped closing yoke 79, which is made of a magnetizable material and constitutes a separate part of the housing 57 of the lens system 37. The actuator 63 further includes two ring-shaped electric coils 81, 83 which are secured to the holder 59 of the main lens 53. Viewed parallel to the optical axis 39, the coils 81, 83 are also arranged next to each other, the coil 81 being arranged opposite the magnet 75 and the coil 83 being arranged opposite the magnet 77, while a ring-shaped air gap 85 is present between the magnets 75, 77 and the coils 81, 83. As shown in FIG. 3, the magnets 75, 77 are magnetized, relative to the optical axis 39, in opposite radial directions R and R'. The coils 81, 83 are wound in opposite directions relative to each other, so that, in operation, an electric current in the coil 81 and an electric current in the coil 83 flow in opposite directions. In this manner, it is achieved that the electromagnetic forces which, in operation, are exerted on the coils 81 and 83 by an interaction between a magnetic field of the magnets 75, 77 and the electric current in the coils 81, 83 are substantially equally directed. The holder 59 is made of a non-magnetizable material, so that the magnets 75, 77 do not exert magnetic forces on the holder 59, and mechanical loads on the mounting elements 65, 67, which are directed at right angles to the optical axis 39, are limited as much as possible.

Figure 5:
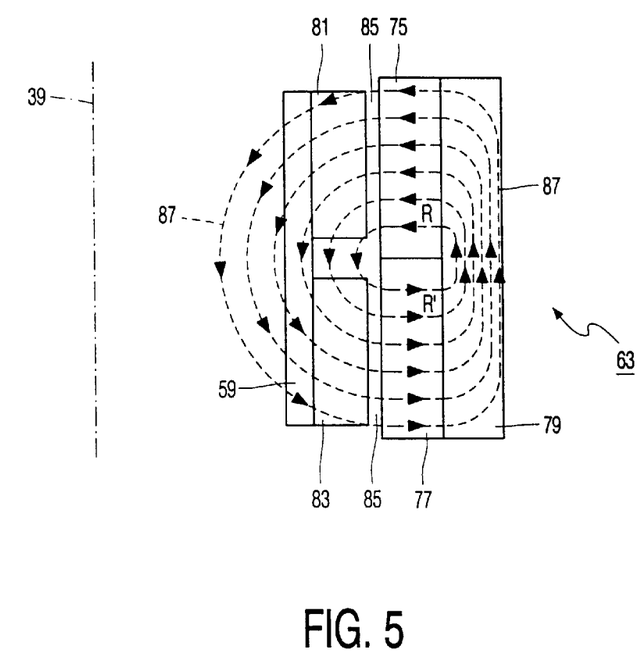

FIG. 5 schematically shows a magnetic field 87 provided by magnets 75, 77 and the closing yoke 79 of the second actuator 63. By virtue of the fact that the magnets 75 and 77 are magnetized in opposite radial directions R and R' relative to the optical axis 39, and secured to the closing yoke 79, a concentrated magnetic field 87 is obtained which passes substantially entirely through the closing yoke 79 and is transferred substantially entirely from the magnet 75 to the magnet 77. As a result, undesirable scattering of the magnetic field 87 is precluded as much as possible. As shown in FIG. 5, the electric coils 81 and 83 are arranged opposite the magnets 75 and 77 in the part of the magnetic field 87 which is transferred from the magnetic 75 to the magnet 77. Due to the fact that the magnetic field 87 is concentrated in the manner described above, magnetic field 87 has a relatively high magnetic field strength at the location of the coils 81, 83, so that by interaction between the magnetic field 87 and an electric current in the coils 81, 83, a relatively high electromagnetic force is obtained. In this manner, a favorable ratio between the electromagnetic force that can be supplied by the second actuator 63 and the dimensions and weight of the magnets 75, 77 and coils 81, 83 of the second actuator 63 is obtained, so that the dimensions and weight of the second actuator 63, which are necessary for obtaining a sufficient electromagnetic force, can be limited.

Figure 6:
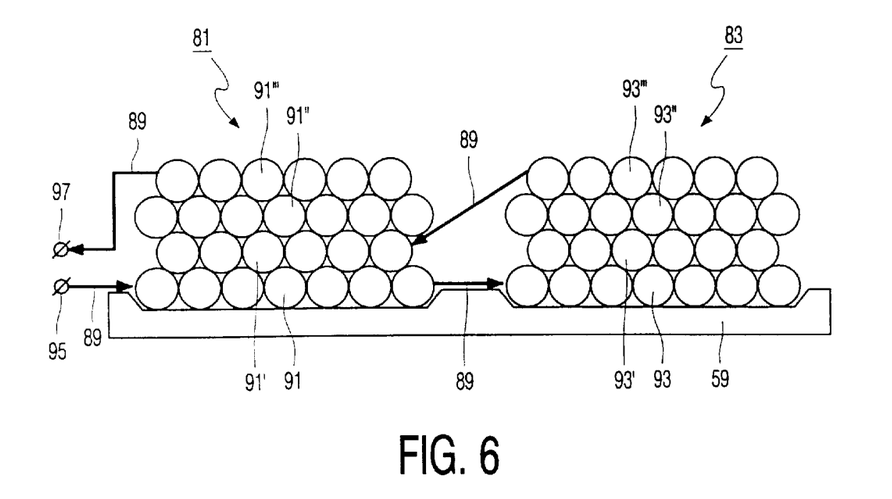
FIG. 6 is a schematic, sectional view of two electric coils which are used in the actuator in accordance with FIG. 5.

The sectional view shown in FIG. 6 of the electric coils 81, 83 of the second actuator 63 represents a method of winding the two coils 81, 83. Two coils 81, 83 are wound from a single wire 89 and each include an even number of winding layers, four in the example shown, namely 91, 91', 91'', 91''', and 93, 93', 93'', 93'''. As shown in FIG. 6, during winding the coils 81, 83, first a first winding layer 91 of the coil 81 is provided. Subsequently, all winding layers 93, 93', 93'', 93''' of the coil 83 are provided, a winding direction of a winding machine used being reversed at the transition from the first winding layer 91 of the coil 81 to the first winding layer 93 of the coil 83. Subsequently, the other winding layers 91', 91'', 91''' of the coil 81 are provided, the winding direction of the winding machine being reversed again at the transition from the last winding layer 93''' of the coil 83 to the second winding layer 91' of the coil 81. As shown in FIG. 6, by using the winding method, that the coils 81, 83 have two common electrical connection points 95, 97 which are situated on one side of the coil 81, so that a simple electrical connection of the coils 81, 83 is obtained. It is noted that such a simple electrical connection is generally obtained if the two coils 81, 83 each have an even number of winding layers. In addition, by means of the above winding method, a necessary number of reversals of the winding direction of the winding machine is limited to a minimum of two. It is noted that such a minimum number of reversals of the winding direction is generally obtained if, successively, an odd number of winding layers of the coil 81, all winding layers of the coil 83, and the remaining winding layers of the coil 81 are wound.

Using of the above-described optical player in accordance with the invention, during scanning the information track of the information carrier 9, information present on the information track can be read or information can be written on the information track. It is noted that the invention also relates to optical players which can only be used to read information present on an information track of an information carrier.

In the above-described optical scanning device 17 in accordance with the invention, the second actuator 63 enables the main lens 53 (objective lens) of the lens system 37 to be displaced relative to the housing 57 and the auxiliary lens 55 (solid immersion lens) of the lens system 37. It is noted that the invention also relates to optical scanning devices and optical players in which, as in the device described in U.S. Pat. No. 5,712,842, an auxiliary lens can be displaced relative to a main lens or objective lens using the actuator of the lens system used in the scanning devices or optical players.

In the above-described optical scanning device 17 in accordance with the invention, the main lens 53 is suspended in the housing 57 of the lens system 37 using the two above-mentioned elastically deformable mounting elements 65, 67, the second actuator 63 being arranged between the two mounting elements 65, 67. Finally, it is noted that the invention also relates to optical scanning devices and optical players in which the lens element to be manipulated of the lens system used therein is journaled in a different manner in the housing of the lens system, for example, using an axially prestressed, conventional plain bearing.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

What is claimed is:

1. An optical scanning device for scanning an information track of an optically scannable information carrier and comprising:

a radiation source for supplying a radiation beam during operation;

an optical lens system with a housing containing two lens elements defining an optical axis, for focusing the radiation beam into a scanning spot on the information carrier, and with a substantially ring-shaped holder for adjustably positioning a first one of the lens elements in the housing, a second one of the lens elements being connected to the housing;

a first actuator for moving the lens system parallel to the optical axis, the lens system including two lens elements; and a second actuator for displacing the first lens element relative to the second lens element, and including:

a substantially ring-shaped closing yolk secured to the housing of the lens system;

two ring-shaped permanent magnets which, viewed parallel to the optical axis, are secured, next to each other, to the closing yoke, the magnets being magnetised in mutually opposite radial directions relative to the optical axis; and two ring-shaped electric coils which are secured to the holder of the first lens element, the coils, viewed parallel to the optical axis, are arranged next to each other, opposite the two magnets, and are wound in mutually opposite directions.

2. The device of claim 1, in which the holder of the first lens element is made from a non-magnetisable material.

3. The device of claim 1, in which the two coils of the second actuator are wound from a single wire and each include an even number of winding layers.

4. The device of claim 3, in which the wire is successively wound so as to form an odd number of winding layers of a first one of the coils, all winding layers of a second one of the coils, and then the remaining winding layers of the first coil.

5. The device of claim 1, in which the first lens element, viewed parallel to the optical axis, is elastically suspended in the housing by two mounting elements which, viewed parallel to the optical axis, are arranged at some distance from each other and extend transversely to the optical axis, each mounting element, viewed parallel to the optical axis, being elastically deformable and, viewed at right angles to the optical axis, being substantially undeformable.

6. The device of claim 5, in which the second actuator, viewed parallel to the optical axis, is arranged between the two mounting elements.

7. The device of claim 1, in which the closing yoke of the second actuator forms a part of the housing.

8. The device of claim 1, in which:
the holder of the first lens element is made from a non-magnetisable material;
the two coils of the second actuator are wound from a single wire and each include an even number of winding layers;
the wire is successively wound so as to form an odd number of winding layers of a first one of the coils, all winding layers of a second one of the coils, and the remaining winding layers of the first coil;
the first lens element, viewed parallel to the optical axis, is elastically suspended in the housing by two mounting elements which, viewed parallel to the optical axis, are arranged at some distance from each other and extend transversely to the optical axis, each mounting element, viewed parallel to the optical axis, being elastically deformable and, viewed at right angles to the optical axis, being substantially undeformable;
the second actuator, viewed parallel to the optical axis, is arranged between the two mounting elements; and
the closing yoke of the second actuator forms a part of the housing.

9. An optical lens system, comprising:
a housing;
two lens elements defining an optical axis, for focusing a radiation beam into a scanning spot on an information carrier;
a ring shaped holder for adjustably positioning a first one of the lenses in the housing, a second one of the lenses being connected to the housing;
a first actuator for moving the lens system parallel to the optical axis; and
a second actuator for displacing the first lens element relative to the second lens elements, and including:
a substantially ring-shaped magnetic closing yolk secured to the hosing;
two ring-shaped permanent magnets which, viewed parallel to the optical axis, are secured, next to each other, to the closing yoke, the magnets being magnetised in mutually opposite radial directions relative to the optical axis; and
two ring-shaped electric coils which are secured to the holder of the first lens element, the coils, viewed parallel to the optical axis, are arranged next to each other, opposite the two magnets, and are wound in mutually opposite directions.

10. The system of claim 9, in which:
the holder of the first lens element is made from a non-magnetisable material;
the two coils of the second actuator are wound from a single wire and each include an even number of winding layers;
the wire is successively wound so as to form an odd number of winding layers of a first one of the coils, all winding layers of a second one of the coils, and the remaining winding layers of the first coil;
the first lens element, viewed parallel to the optical axis, is elastically suspended in the housing by two mounting elements which, viewed parallel to the optical axis, are arranged at some distance from each other and extend transversely to the optical axis, each mounting element, viewed parallel to the optical axis, being elastically deformable and, viewed at right angles to the optical axis, being substantially undeformable;
the second actuator, viewed parallel to the optical axis, is arranged between the two mounting elements; and
the closing yoke of the second actuator forms a part of the housing.

11. An optical player comprising:
a table for rotation about an axis of rotation;
an optical scanning device for scanning an information track of an optically scannable information carrier which can be arranged on the table; and
a displacement device for displacing the scanning device relative to the axis of rotation mainly in a radial direction;
the optical scanning device including:
a radiation source for supplying a radiation beam during operation;
an optical lens system with a housing containing two lens elements defining an optical axis, for focusing the radiation beam into a scanning spot on the information carrier, and with a substantially ring-shaped holder for adjustably positioning a first one of the lens elements in the housing, a second one of the lens elements being connected to the housing;
a first actuator for moving the lens system parallel to the optical axis; and
a second actuator for displacing the first lens element relative to the second lens element, and including:
a substantially ring-shaped closing yolk secured to the housing of the lens system;
two ring-shaped permanent magnets which, viewed parallel to the optical axis, are secured, next to each other, to the closing yoke, the magnets being magnetised in mutually opposite radial directions relative to the optical axis, and
two ring-shaped electric coils which are secured to the holder of the first lens element, the coils, viewed parallel to the optical axis, are arranged next to each other, opposite the two magnets, and are wound in mutually opposite directions.

12. The player of claim 11, in which:
the holder of the first lens element is made from a non-magnetisable material;
the two coils of the second actuator are wound from a single wire and each include an even number of winding layers;
the wire is successively wound so as to form an odd number of winding layers of a first one of the coils, all winding layers of a second one of the coils, and the remaining winding layers of the first coil;

the first lens element, viewed parallel to the optical axis, is elastically suspended in the housing by two mounting elements which, viewed parallel to the optical axis, are arranged at some distance from each other and extend transversely to the optical axis, each mounting element, viewed parallel to the optical axis, being elastically deformable and, viewed at right angles to the optical axis, being substantially undeformable;

the second actuator, viewed parallel to the optical axis, is arranged between the two mounting elements; and the closing yoke of the second actuator forms a part of the housing.

* * * * *